US012720513B2

(12) United States Patent
English et al.

(10) Patent No.: US 12,720,513 B2
(45) Date of Patent: Aug. 25, 2026

(54) PORTABLE COUNTERMEASURE SYSTEM

(71) Applicant: SteelRock Technologies Ltd, London (GB)

(72) Inventors: Rupert Joseph English, London (GB); Christopher Hamer, London (GB)

(73) Assignee: STEELROCK TECHNOLOGIES LTD, London (GB)

( * ) Notice: Subject to any disclaimer, the term of this patent is extended or adjusted under 35 U.S.C. 154(b) by 385 days.

(21) Appl. No.: 18/495,916

(22) Filed: Oct. 27, 2023

(65) Prior Publication Data

US 2024/0147444 A1 May 2, 2024

(30) Foreign Application Priority Data

Oct. 28, 2022 (GB) .................................... 2216006

(51) Int. Cl.
*H04W 72/0453* (2023.01)
*H04B 1/04* (2006.01)
*H04K 3/00* (2006.01)
*H04W 84/12* (2009.01)

(52) U.S. Cl.
CPC .......... *H04W 72/0453* (2013.01); *H04B 1/04* (2013.01); *H04K 3/00* (2013.01); *H04K 3/41* (2013.01); *H04K 3/42* (2013.01); *H04B 2001/0408* (2013.01); *H04K 3/43* (2013.01); *H04K 2203/18* (2013.01); *H04K 2203/24* (2013.01); *H04K 2203/32* (2013.01); *H04W 84/12* (2013.01)

(58) Field of Classification Search
None
See application file for complete search history.

(56) References Cited

U.S. PATENT DOCUMENTS

2015/0341139 A1* 11/2015 Bradley .............. G06F 21/6209 348/143
2019/0236947 A1* 8/2019 Wood ...................... H04W 4/46
2020/0037267 A1* 1/2020 Gray ................. H04W 72/0453
2020/0212588 A1* 7/2020 Rofougaran ............. H01Q 1/36
2020/0309942 A1* 10/2020 Kunz .................... G01S 13/931
2023/0052574 A1* 2/2023 Sadikin .................... H04K 3/42

FOREIGN PATENT DOCUMENTS

CN 201435450 Y 3/2010
CN 109327275 A 2/2019
CN 214429542 U 10/2021

(Continued)

OTHER PUBLICATIONS

U.S. Appl. No. 63/347,316 (Year: 2022).*

(Continued)

*Primary Examiner* — Jay L Vogel
(74) *Attorney, Agent, or Firm* — Tarolli, Sundheim, Covell & Tummino LLP

(57) ABSTRACT

A portable countermeasure system for disabling or disrupting short-range wireless communication networks, comprising a signal generator for generating a first signal and a second signal, each in the Wi-Fi frequency bands, a signal multiplexer for multiplexing the first and second signals outputted from the signal generator into a combined signal, and a circularly polarised antenna for transmitting the combined signal.

16 Claims, 2 Drawing Sheets

(56) References Cited

FOREIGN PATENT DOCUMENTS

| | | | | | |
|---|---|---|---|---|---|
| JP | 3608287 | B2 | * | 1/2005 | |
| JP | 2012160184 | A | * | 8/2012 | ......... G06K 7/10554 |
| WO | WO-2012075029 | A1 | * | 6/2012 | ............. H04K 3/415 |
| WO | 2017053693 | | | 3/2017 | |
| WO | WO-2017160281 | A1 | * | 9/2017 | ............. H01L 24/13 |
| WO | WO-2023235238 | A1 | * | 12/2023 | ........... H01Q 21/245 |

OTHER PUBLICATIONS

Extended European Search Report dated Mar. 20, 2024 for EP Application No. 23205981.6.

GB Search Report dated Apr. 27, 2023 for Application No. GB2216006.3.

* cited by examiner

PORTABLE COUNTERMEASURE SYSTEM

BACKGROUND TO THE INVENTION

Many kinds of devices communicate using short-range radio-frequency wireless signals, and the number and variety of such devices is constantly increasing. Due to the decreasing cost of wireless communications technology as well as the trend towards networking all manner of devices (the so called "Internet of Things"), wireless communication functionality is no longer limited to computers and mobile cell phones. Instead, devices such as video doorbells, internal and external CCTV systems, cordless phones, baby monitors, voice assistants, speakers, and televisions may include wireless communication functionality, allowing users to use, control, or monitor such devices remotely.

Short-range wireless communication signals are transmitted between such devices using a variety of wireless standards, including, Wi-Fi and other WLAN (Wireless Local Area Network) standards, Bluetooth, Zigbee and other WPAN (Wireless Personal Area Networks) standards, and other specialised communication signals and standards. WLAN and WPAN communications networks operate in similar, even overlapping frequency bands, and may even communicate in the same channels within those bands. The precise ranges of the frequency bands and channels are defined by Institute of Electrical and Electronics Engineers (IEEE) standards as well as other national and international regulations. For Wi-Fi, two frequency bands are generally used, the first extending over the 2.4-2.5 GHz unlicensed Industrial, Scientific, and Medical (ISM) band, and the second extending from 5-6 GHz and in some instances up to 7.2 GHz. Bluetooth and Zigbee WPAN networks also operate in the 2.4-2.5 GHz unlicensed ISM band.

SUMMARY OF THE INVENTION

According to a first aspect of the present invention there is provided a portable countermeasure system (PCS) comprising: a signal generator for generating a first signal and a second signal each in the Wi-Fi frequency bands; a signal multiplexer for multiplexing the first and second signals outputted from the signal generator into a combined signal; a circularly polarised antenna for transmitting the combined signal, the antenna comprising: a peak directivity of at least 8 dBm; a Root Mean Squared (RMS) directivity over an 180 degree field of at least 35 dBm; and a half-power beam width of less than 90 degrees in the Wi-Fi frequency bands; and an activation mechanism for activating the signal generator.

Embodiments of the present invention are well-suited to use by police and security services operating in crowded urban environments. Potential targets of interest for civilian security services generally utilise civilian consumer devices, which commonly communicate using wireless communications signals in the Wi-Fi frequency bands. By targeting the Wi-Fi frequency bands for disruption, police and security services can effectively disrupt use of a large range of devices while minimising collateral effects on infrastructure-level long-range communications networks. The characteristics of the directional antenna concentrate emissions towards the boresight of the PCS, maximising the device's effective range. However, the beam is sufficiently wide that the PCS does not need to be aimed precisely on target to be effective and can be used for disabling multiple target devices spread out in a target area.

In the present disclosure, "Wi-Fi frequency bands" should be understood as meaning the frequency bands used to transmit Wi-Fi signals. As previously mentioned, Wi-Fi signals are transmitted in two frequency bands, the first being the 2.4 GHz to 2.5 GHz unlicensed ISM band, and the second ranging from 5.0 GHz up to 7.2 GHz. The frequency band extending from 2.4 GHz to 2.5 GHz may be referred to as the "2.4 GHz Wi-Fi band". The frequency band between extending from 5.0 GHz to 7.2 GHz may be referred to as the "5 GHz Wi-Fi band". The range extending from 5.9 GHz to 7.2 GHz may additionally or alternatively be referred at the "6 GHz band". It should be understood that countermeasure signals transmitted in the Wi-Fi frequency band can disrupt more than simply signals transmitted using the Wi-Fi wireless standard. Other wireless standards also utilise the frequency bands described above and can also be disrupted using the present invention, including Bluetooth and Zigbee as well as short-range communication signals for other applications. This allows the present invention to disrupt and disable a wide range of wireless communications devices, including some which may not utilise Wi-Fi functionality.

Preferably, the combined signal has an output power of between 2 and 5 Watts. "Output power" refers to the total transmitted power of the output signal. Such a low range of power levels allows the device to transmit for longer on a single battery charge and requires less powerful or even no cooling systems for the internal components of the PCS. The low transmission power also limits the effective range of the PCS, which advantageously minimises collateral effects downrange and to the sides of a target.

Preferably, between the signal generator and signal combiner, each of the first and second signals pass through a filter. The filters improve the quality of the generated signals before they pass to the multiplexer, and are particularly beneficial in removing noise, as well as components of one generated signal which would interfere with another generated signal when combined.

Preferably, the circularly polarised antenna is a spiral antenna. Spiral antennas provide good directionality within a physically small form factor. Spiral antennas are also more physically robust than other antennas because they can be made as a single-piece rigid unit and do not require fragile external components such as reflectors or directors.

Preferably, the combined signal comprises a first frequency band and a second frequency band in the Wi-Fi frequency bands. By emitting a combined signal comprising two distinct frequency bands, the PCS can disrupt two wireless communications frequency bands without wasting power or causing collateral effects in frequencies between the two wireless communications frequency bands.

Preferably, the first signal is generated in the first frequency band and the second signal is generated in the second frequency band. This enables each output port of the signal generator to be respectively configured or optimised for generating signals in a particular frequency band.

Preferably, the first frequency band overlaps with the 2.4 GHz Wi-Fi band and the second frequency band overlaps with the 5 GHz Wi-Fi band. "Wi-Fi band" refers to the unlicensed frequency bands used for 2.4 GHz and 5 GHz Wi-Fi and other wireless communication signals in a particular region. "Overlaps" means that the first and second frequency band each overlap at least a portion of one of the respective Wi-Fi bands. This can mean that the first and second frequency bands each overlap one end of a Wi-Fi band, a portion of a Wi-Fi band, and/or fully encompass the whole of a respective Wi-Fi band. For example, the first frequency band could extend from 2.2 GHz to 2.6 GHz, thereby overlapping and fully encompassing the 2.4-GHz Wi-Fi band. In another example, the second frequency band could partially encompass the 5 GHz Wi-Fi band from 5.2-5.4 GHz.

Preferably, the first frequency band extends from 2.2 GHz to 2.5 GHz and the second frequency band extends from 5.0 GHz to 7.2 GHz. This advantageously means that the first and second frequency bands fully encompass both the 2.4 GHz and 5 GHz Wi-Fi bands, which are the two frequency bands most commonly used for Wi-fi and other short-range wireless communications.

Preferably, the combined signal is emitted only within the first and/or second frequency bands. This ensures that disruption will be limited to these two frequency bands and will minimise collateral effects in other frequency bands.

Preferably, the system further comprises a handgun form-factor. A handgun form-factor offers further advantages for police and security services operating in crowded urban environments. Users with experience of devices such as firearms, tasers, and radar guns will have familiarity with this form-factor and will be able to use the PCS more effectively. In addition, the small size of a handgun form-factor device is easier to use indoors, while mobile, and on covert operations.

Preferably, the system comprises an activation indicator for outputting an activation alert when the activation mechanism is activated. Unlike a firearm, an electromagnetic effector may not inherently provide any detectible feedback in the form of recoil, noise etc when active and transmitting. An activation indicator for providing an activation alert is advantageous because it will reduce instances of a device being inadvertently left active to cause collateral effects and/or drain the power source of the device.

Preferably, the activation alert comprises an illumination or haptic signal, or a combination of the two. The illumination may be in the form of an LED, or other kind of illuminator. The form of the illumination activation alert could include different colours, brightness levels or patterns depending on the status of the PCS. An illumination activation alert is advantageous because it can alert a person who is not holding the PCS that the PCS is active. The haptic signal could be provided by a rumble motor, or other mechanical feedback device, such that the PCS provides vibration or other physical feedback depending on its activation state. By providing haptic feedback such as vibration when the PCS is transmitting, the user does not have to look at the PCS to confirm its status.

Preferably the system comprises a cooling system. The cooling system is used to cool the internal components of the PCS and enables the PCS to operate continuously for longer periods without overheating. The cooling system may be active or passive.

Preferably, the system comprises a mount for mounting accessories to the system or for mounting the system to another device. The mount may be used to attach accessories (for example an optic) to the PCS, or to attach the PCS itself to a larger system. For example, the mount could be used to mount the PCS as an under-barrel attachment to a rifle. This could be used by an armed police officer to disable a target device without destroying it, while still keeping their firearm trained on the target device.

Preferably, the mount is a rail interface system. The rail interface system could be proprietary, or of a kind commonly used in the art such as Picatinny rails. A rail mounting system allows precise and robust positioning of accessories mounted to the PCS, or conversely precise positioning of the PCS when it itself is mounted. Many kinds of devices are compatible with commonly used rail interface systems.

Preferably, the activation mechanism comprises a button, trigger or switch. A button, trigger or switch provides mechanical feedback when activated, which may be advantageous for operating the PCS in the dark. Furthermore, such activation mechanisms are physically robust.

BRIEF DESCRIPTION OF THE DRAWINGS

An example of the present invention will now be described in detail with reference to the accompanying drawings, in which FIGS. 1*a* and 1*b* respectively show side and front views of a portable countermeasure system.

DETAILED DESCRIPTION

There exists a need for police and security services to have a means to disable or disrupt a particular target device operating using short-range wireless communication networks, and/or to disable or disrupt multiple devices operating in a particular target location. Since the device(s) to be disabled may be located in a crowded urban environment, it is further desirable to minimise collateral effects—i.e., the effects on any non-target devices in the vicinity of the target device or area.

It is desirable that the means for disrupting short-range wireless communication signals should not disrupt long-range communications signals. Short-range communications signals are distinct from long-range communications signals such as those used for GPS (Global Positioning System: a navigation system which allows a device to determine its position on Earth by receiving communications signals from satellites), long-distance radio transmission and many mobile cellular networks. Long-range signals may have a range of up to tens, hundreds, or even (in the case of GPS) thousands of kilometres, whereas short-range communications signals like Wi-Fi generally have a range limited to tens of metres and at most a few hundred metres. The signal bands used for long-range communications are strictly regulated, and long-range wireless communications systems are more generally operated as national infrastructure by governments and large institutions such as telecommunications companies. By contrast, short-range communications systems and networks are commonly operated by individuals and private entities within their own local premises. Accordingly, disrupting short-range communication signals without disrupting long-range communication signals is likely to have lower collateral effects.

Figure 1A:
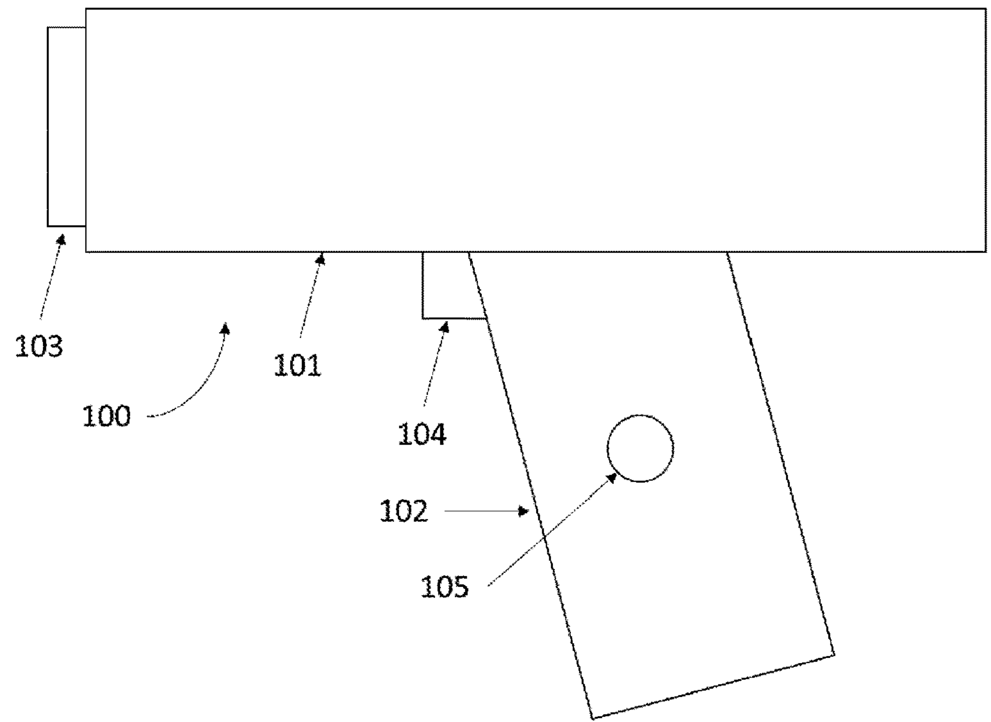
Figure 1B:
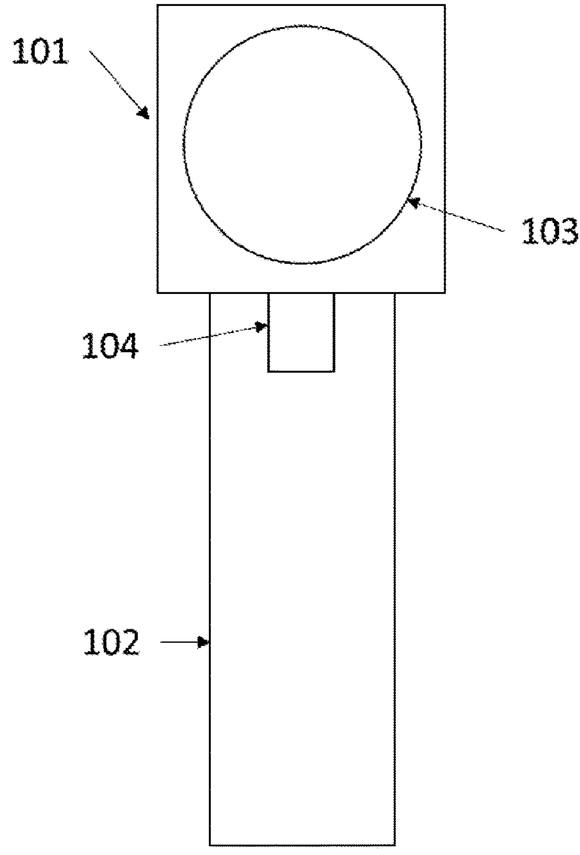

Exterior views of a portable countermeasure system (PCS) are shown in FIGS. 1*a* and 1*b*. The PCS 100 has a handgun form factor, with a handgrip 102 positioned on the underside of a main body 101. This enables the PCS 100 to be used single-handedly, and is intuitive even for a user unfamiliar with handling firearms. Alternative configurations of the PCS 100 may use a different form factor. For example, a "tube" form-factor PCS 100 consisting of a main body 101 without a handgrip 102 may be more suitable for applications in which the PCS is remotely activated.

The PCS 100 is powered by a power source. The power source may comprise a battery (not shown), which may be integral to the device, or removable for replacement/charging. A removeable battery is advantageous because when depleted it can be quickly swapped out for a fully charged replacement. Alternatively, the PCS 100 may be powered by connection to an external power source (not shown) by means of a charging cable or other connection means.

The PCS 100 comprises an activation switch 104 located on the front of the handgrip 102. The activation switch 104 may also be located in another location on the PCS such as the side of the handgrip 102. The activation switch 104 may comprise a button, switch or trigger, or other form of mechanism. When the activation switch 104 is activated, the PCS emits a directional disruption signal. The PCS 100 may further comprise sights (not shown) to help the user aim at a particular target. The PCS 100 may comprise mounting means (not shown) for mounting the PCS 100. For example, the mounting means could be a rail mount system such as a Picatinny rail or Weaver for mounting the PCS 100 onto a rifle. Alternatively, the mounting means may be suitable for mounting the PCS 100 onto a vehicle such as a drone. The mounting means could also be used for mounting accessories to the PCS 100 such as optical or iron sights, night vision sights, laser pointers, torches, cameras, and other accessories known in the art.

Unlike a firearm, a device emitting radio waves may not inherently provide any feedback in the form of recoil, noise etc when in an active state. The PCS 100 therefore comprises one or more activation indicator 105 features for providing an activation alert to the user. The activation indicator 105 could comprise an LED light which illuminates or changes colour when the PCS is active and transmitting a signal. This prevents a user from draining the power source of the PCS 100 by inadvertently leaving it in an active state, or from accidentally causing collateral effects against an unintended target because the user did not know the PCS 100 was transmitting. In some embodiments, the activation indicator 105 comprises a device for providing haptic feedback, for example a rumble motor of the kind found in smartphones or gaming controllers. By providing haptic feedback such as vibration when the PCS is transmitting, the user does not have to look at the PCS 100 to confirm its status. This may be more intuitive for users familiar with conventional firearms. Furthermore, an illuminated activation indicator could give away the user's position when operating in the dark, which could be disadvantageous when conducting covert operations, such as a police raid indoors or in the dark.

The directional antenna 103 is positioned on the front end of the main body 101. The directional antenna 103 may be contained within a housing made of a material that is transparent in the Wi-Fi frequency spectrum. Alternatively, the directional antenna 103 may be positioned within the main body 101, and the main body 101 may have a front portion which is transparent in the Wi-Fi frequency spectrum.

The directional antenna 103 is circularly polarised, such that it emits a circularly polarised signal. The polarisation of a circularly polarised signal will not change significantly enough after being reflected off objects to reduce the effectiveness of the signal. This is a particular advantage for the PCS 100, which may be operated indoors or in other cluttered urban environments where the emitted signal will be reflected off walls and objects. A further advantage of a circularly polarised signal is that it will disrupt linearly polarised signals regardless of the direction of polarisation. By contrast, a PCS 100 equipped with a linearly polarised antenna would become less effective when attempting to disrupt a linearly polarised signal at angles not aligned to the antenna's direction of polarisation, and the user would need to manually orient the PCS 100 to align the polarisation. Linearly polarised antennas would be rendered less effective should the target possess two orthogonal linearly polarised antennas with the ability to switch the signal between them to evade disruption caused by a single linearly polarised signal from the PCS 100, regardless of its orientation. In addition, circularly polarised signals may also be able to pass through mediums which absorb radio frequencies at certain linear polarisations.

In a preferred embodiment the directional antenna 103 is a spiral antenna. Spiral antennas are circularly polarised and provide good directionality within a physically small form factor. Spiral antennas are also more physically robust than other antennas, because they can be made as a single-piece rigid unit and do not require fragile external components such as reflectors or directors. The operational wavelength of a spiral or helical antenna may be governed by the outer diameter of the spiral/helix. The larger the diameter, the longer the operational wavelength and the lower the frequency which can be effectively transmitted. It can be shown that a spiral antenna optimised to emit a signal at a frequency of 2.4 GHz requires a diameter of around 4 cm. Thus, a spiral antenna optimised to emit signals in the Wi-Fi frequency band can be made small enough to fit inside the main body of the handgun form-factor main body 101. By contrast, a spiral or helical antenna optimised to emit signals in the 1.2 GHz GPS frequency band would require a diameter up to 8 cm, which would be unwieldly to integrate into a handgun form factor PCS.

Figure 2:
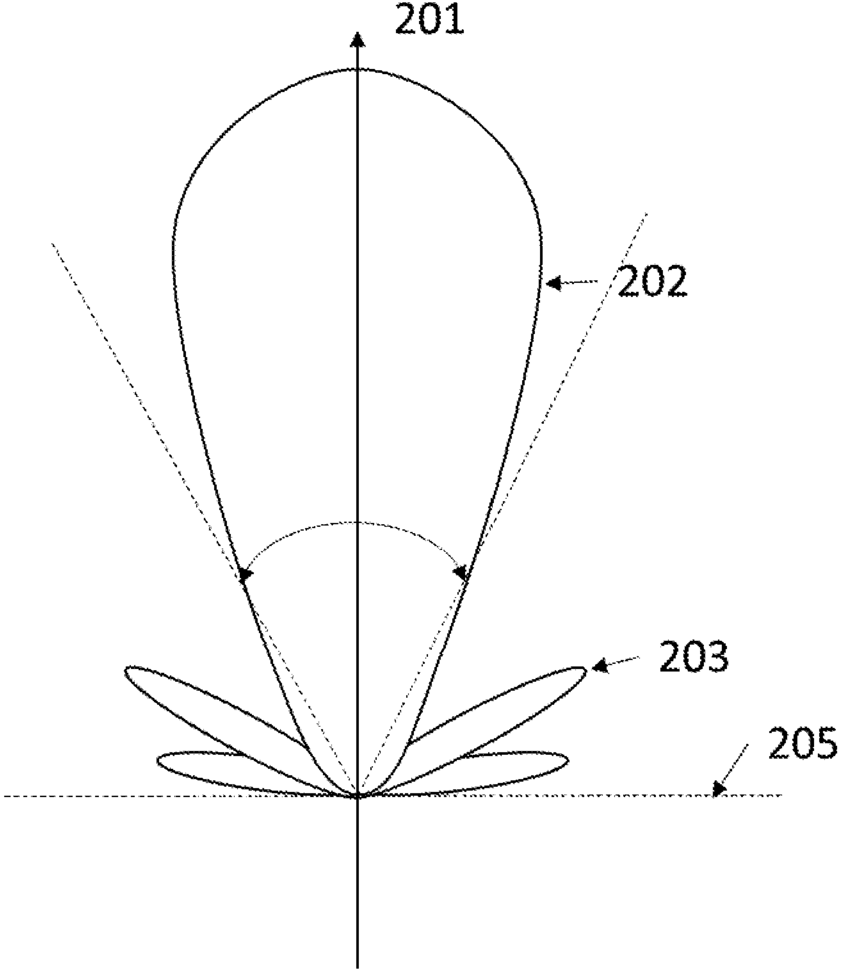
FIG. 2 shows a generic radiation pattern emitted by a directional antenna; and, FIG. 3 shows a schematic of the components of the signal output system.

Referring now to FIG. 2, the half power beam width 204 is the angle across the boresight 201 of the directional antenna 103, at which the magnitude of the radiation power decreases by 50% (or 3 dBm) from the peak power of the main lobe 202. The directional antenna 103 is configured to have a half power beam width 204 of less than 90 degrees in the Wi-Fi frequency spectrum. The directional antenna 103 has a 180 degree field, meaning that the radiation pattern of the antenna (including the side lobes 203) is bounded 205 at 90 degrees to the boresight 201. The directional antenna 103 has a peak directivity of 8 dBm, and an RMS directivity of 35 dBm as integrated over the 180 degree field bounding the radiation pattern.

Concentrating emissions towards the boresight of the PCS 100 maximises the device's effective range for a given total transmission power, as well as also reducing collateral effects at angles away from the direction of aim. However, such a beam width 204 is also sufficiently wide so that the PCS 100 does not need to be aimed precisely on target to be effective, and so that the PCS 100 can be used for disabling multiple target devices spread out in a target area that falls within the beam width 204. Thanks to the 180 degree field of the directional antenna 103, no radiation is emitted backwards towards the user. Therefore, any wireless communications devices carried on or behind the PCS 100 (for example, the user's own wireless communications device carried on their person) will be subjected to minimal disruption.

Figure 3:
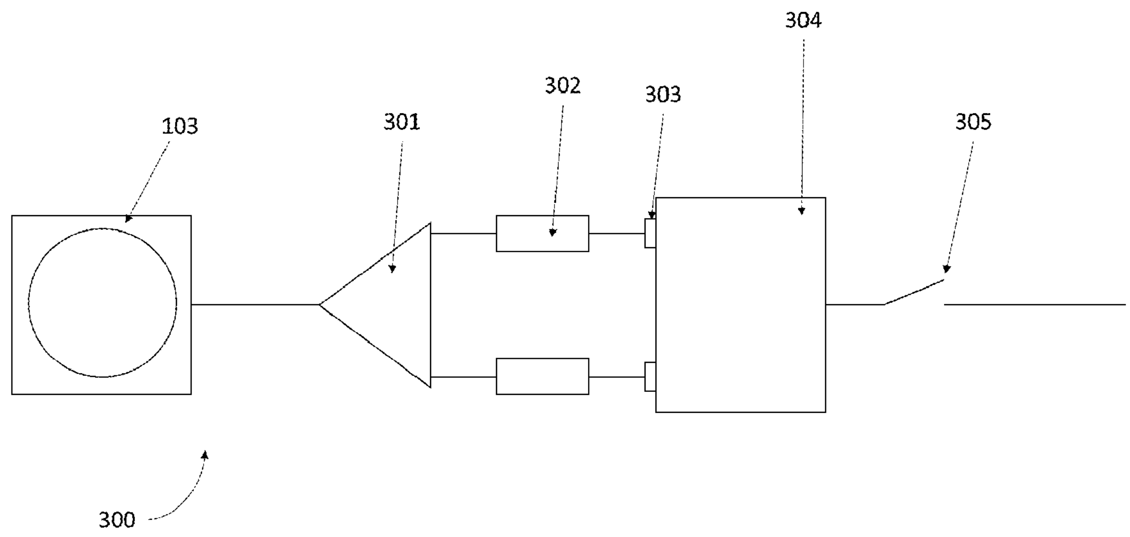

Referring now to FIG. 3, the signal output system 300 of the PCS 100 is shown. The signal output system 300 is configured to disrupt wireless communication signals in the Wi-Fi frequency bands. This can be done by emitting a combined signal comprising disruption signals on one or more frequencies within the Wi-Fi frequency bands. A target device receiving wireless communications signals in the same frequencies will struggle to distinguish the wireless communication signals from the disruption signals.

In an embodiment, the disruption signals are used to saturate a wireless communication channel so that it cannot be used to communicate with the target device. Alternatively or additionally, the disruption signals may degrade the ability of the target device to receive signals, reducing the quality or data transfer rate of signals received, or decreasing the target's maximum effective reception range. The disruption signals may comprise simple sine waves emitted in the target wireless communication bands. Alternatively, the disruption signals may be modulated in ways known in the art, such as sweeping the disruption signals over a target frequency band.

The signal generator 304 generates at least two independently generated signals. The generated signals are transferred out of the signal generator 304 from respective output ports 303. Each generated signal is the filtered through a respective filter 302. One or more of the filters 302 may be a cavity filter. In an embodiment, each generated signal passes through a plurality of sequential filters 302. Once filtered, the filtered generated signals are transferred to the multiplexer 301. When there are only two generated signals, the multiplexer 301 may be known as a diplexer. The multiplexer 301 may alternatively be a signal combiner. The multiplexer 301 multiplexes the filtered signals to form a single combined signal which is transferred to the antenna 103 to be transmitted. The signal output system 300 may be configured so that the signals generated by the signal generator 304 remain independent and do not interfere with each other even once combined in the multiplexer 301. For example, where the first and second generated signal are generated in different frequency bands, the signals can be combined using frequency-domain multiplexing in the multiplexer 301 with no overlap between the signals. The antenna 103 can then continuously transmit the combined signal from the multiplexer 301, containing both generated signals separated in the frequency band. Alternatively, the generated signals may be combined in the multiplexer using other kinds of multiplexing known in the art.

In an embodiment, the signal generator 304 generates a first signal and a second signal, which are filtered and combined by the multiplexer to form a combined signal in which the first signal is emitted in the 2.4-2.5 GHz range and the second signal is emitted in the 5.0-6.0 GHz range. This provides disruption signals for disrupting two of the most commonly used wireless communication frequency bands simultaneously.

When combined through a passive lossless multiplexer 301, the power of the combined signal is simply the sum of the power of the input generated signals. In preferred embodiments, the two signals each have a power of at least 1 Watt and preferably up to around 2.5 Watts each, giving the combined output signal a power of between 2 and 5 Watts. A relatively low transmission power also limits the effective range of the PCS 100, which advantageously minimises collateral effects downrange and to the sides of a target.

To dissipate the heat generated by the internal components of the signal output system 300, the PCS 100 may comprise a cooling system. The cooling system may be either active (meaning that the system comprises active components such as fans or pumps), or passive (meaning that the system relies on passive conduction, convection or radiation patterns). The cooling system may be switchable between active and passive modality. Active cooling systems can be configured to dissipate more heat. However, passive cooling systems may have the advantage of silent operation, whereas active cooling components such as fans and pumps generate noise. Active cooling systems may therefore give away the position of the user of the PCS 100 when conducting covert operations, especially given that the signal output system does not itself produce any noise when active.

The signal generator 304 is activated by means of an activation mechanism 305 (which may for example be the activation switch 104 shown in FIG. 1). The activation mechanism 305 may be a switch such as a "toggle" style switch, such that the signal generator 304 begins generating a signal when the switch is pressed and continues generating a signal until the switch is pressed again. Alternatively, the switch may be a "trigger" style switch, such that the signal generator 304 only generates a signal while the switch is pressed and ceases transmitting as soon as the switch is released. The activation mechanism 305 itself may be switchable between "toggle" and "trigger" functionality. The activation mechanism 305 may be configured to allow remote operation of the PCS 100. For example, the activation mechanism may be electronic, electromagnetic, or electro-mechanical so that when the PCS 100 is mounted to a firearm or a vehicle, a user can activate the PCS 100 by sending a remote signal to the activation mechanism 305 rather than having to physically push a trigger on the PCS 100. The remote activation and deactivation signals and PCS 100 should be configured so that activation of the PCS 100 does not disrupt its own ability to receive remote activation and deactivation signals. The activation mechanism 305 may be connected to the activation indicator 105, so that an activation indication is produced when the activation mechanism 305 and signal generator 304 are active.

The invention claimed is:

1. A portable countermeasure system (PCS) comprising:

a signal generator for generating a first signal and a second signal each in the Wi-Fi frequency bands;

a signal multiplexer for multiplexing the first and second signals outputted from the signal generator into a combined signal;

a circularly polarised antenna for transmitting the combined signal, the antenna comprising:

a peak directivity of at least 8 dBm;

an Root Mean Square (RMS) directivity over an 180 degree field of at least 35 dBm; and a half-power beam width of less than 90 degrees in the Wi-fi frequency bands; and, an activation mechanism for activating the signal generator.

2. The system of claim 1, wherein the combined signal has an output power of between 2 and 5 Watts.

3. The system of claim 1, wherein between the signal generator and signal multiplexer, each of the first and second signals pass through a filter.

4. The system of claim 1, wherein the circularly polarised antenna is a spiral antenna.

5. The system of claim 1, wherein the combined signal comprises a first frequency band and a second frequency band in the Wi-Fi frequency bands.

6. The system of claim 5, wherein the first signal is generated in the first frequency band and the second signal is generated in the second frequency band.

7. The system of claim 5, wherein the first frequency band overlaps with the 2.4 GHz Wi-Fi band and the second frequency band overlaps with the 5 GHz Wi-Fi band.

8. The system of claim 5, wherein the first frequency band extends from 2.2 GHz to 2.5 GHz and the second frequency band extends from 5.0 GHz to 7.2 GHz.

9. The system of claim 5, wherein the combined signal is emitted only within the first and/or second frequency bands.

10. The system of claim 1, wherein the system comprises a handgun form-factor.

11. The system of claim 1, wherein the system comprises an activation indicator for outputting an activation alert when the activation mechanism is activated.

12. The system of claim 11, wherein the activation alert comprises an illumination or a haptic signal.

13. The system of claim 1, wherein the system comprises a cooling system.

14. The system of claim 1, wherein the system comprises a mount for mounting accessories to the system or for mounting the system to another device.

15. The system of claim 14, wherein the mount is a rail interface system.

16. The system of claim 1, where the activation mechanism comprises a button, trigger or switch.

* * * * *